United States Patent
Park et al.

(10) Patent No.: US 8,373,723 B2
(45) Date of Patent: Feb. 12, 2013

(54) METHOD AND APPARATUS TO PROVIDE PLOT DATA OF CONTENTS

(75) Inventors: Hong-seock Park, Ansan-si (KR); Jin-Seok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1253 days.

(21) Appl. No.: 12/169,198

(22) Filed: Jul. 8, 2008

(65) Prior Publication Data

US 2009/0102848 A1 Apr. 23, 2009

(30) Foreign Application Priority Data

Oct. 18, 2007 (KR) ........................ 10-2007-0105036

(51) Int. Cl.
*G09G 5/02* (2006.01)

(52) U.S. Cl. ......... 345/619; 345/581; 345/625; 345/689

(58) Field of Classification Search ............................ None
See application file for complete search history.

(56) References Cited

U.S. PATENT DOCUMENTS

| 6,665,870 | B1 * | 12/2003 | Finseth et al. ................ 725/40 |
| 2002/0152474 | A1 * | 10/2002 | Dudkiewicz ................ 725/136 |
| 2004/0148640 | A1 * | 7/2004 | Masukura et al. ............ 725/135 |
| 2005/0058435 | A1 * | 3/2005 | Chung et al. .................... 386/95 |
| 2008/0263600 | A1 * | 10/2008 | Olague et al. ................ 725/58 |
| 2008/0320523 | A1 * | 12/2008 | Morris et al. ................ 725/47 |

FOREIGN PATENT DOCUMENTS

| JP | 2004-241873 | 8/2004 |
| KR | 2005-93452 | 9/2005 |

* cited by examiner

*Primary Examiner* — Kee M Tung
*Assistant Examiner* — Jwalant Amin
(74) *Attorney, Agent, or Firm* — Stanzione & Kim, LLP

(57) ABSTRACT

A method and an apparatus to provide time based plot data of contents. The method includes extracting a time of requesting plot data, based on time information that is recorded on a predetermined unit-by-unit basis, when a signal to request plot data is received while contents are being reproduced; checking whether there is time based plot metadata corresponding to the requested plot data; and extracting plot data corresponding to a period from a start time of contents to the time of requesting the plot data and displaying the plot data if the time based plot metadata exists.

12 Claims, 6 Drawing Sheets buffer

<00:00:05>
The two men appeared out of nowhere, a few yards apart in the narrow, moonlit lane.
<00:00:52>
For a second they stood quite still, wands directed at each other's chests.
<00:02:34>
Then, recognizing each other, they stowed their wands beneath their cloaks and started walking briskly in the same direction.
<00:04:37>
"News?' asked the taller of the two. "The best," replied Severus Snape.
<00:05:04>
The lane was bordered on the left by wild, low-growing brambles, on the right by a high, neatly manicured hedge.
<00:06:38>
The men's long cloaks flapped around their ankles as they marched.

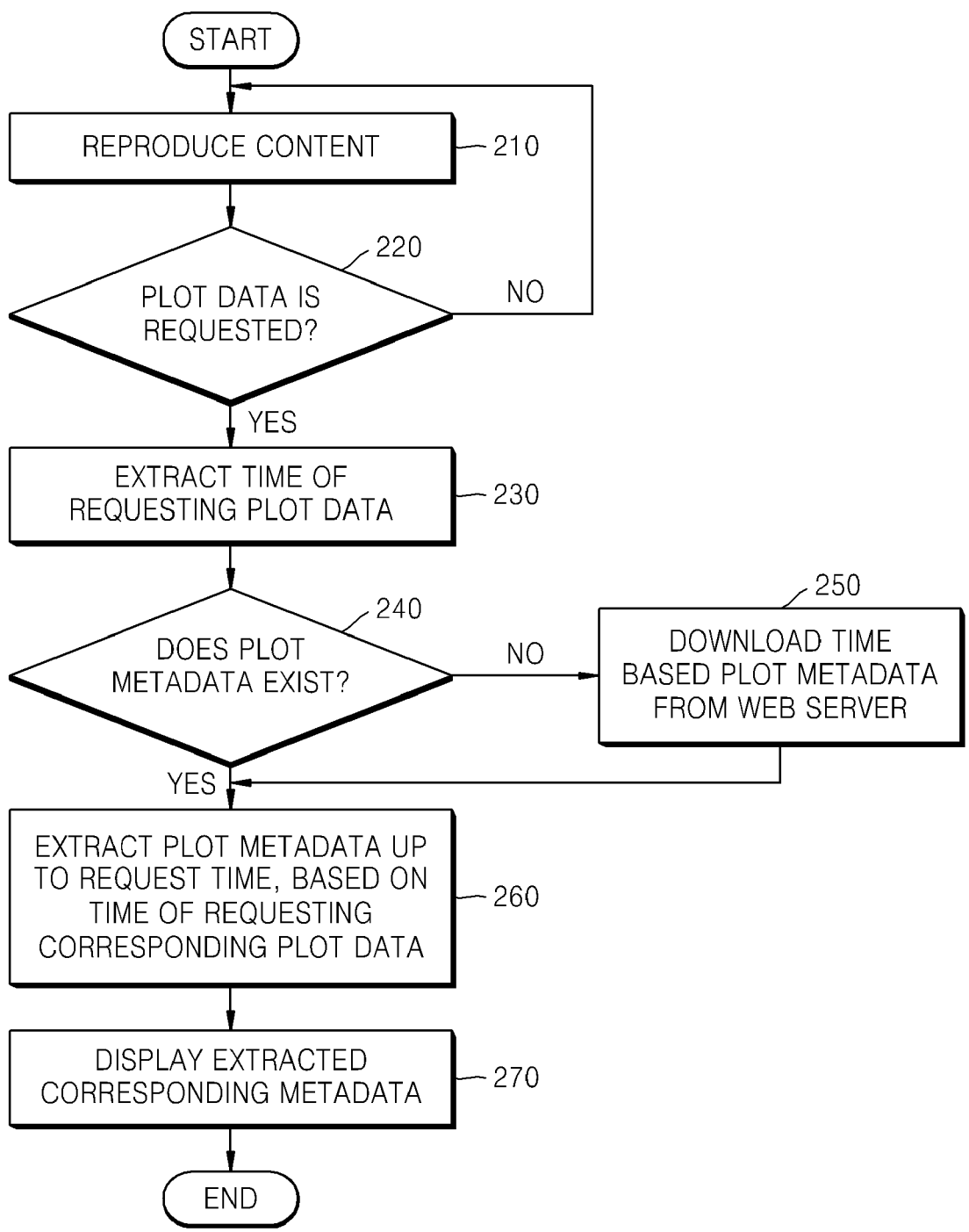

FIG. 3

<00:00:05>
The two men appeared out of nowhere, a few yards apart in the narrow, moonlit lane.
<00:00:52>
For a second they stood quite still, wands directed at each other's chests.
<00:02:34>
Then, recognizing each other, they stowed their wands beneath their cloaks
and started walking briskly in the same direction.
<00:04:37>
"News?" asked the taller of the two. "The best," replied Severus Snape.
<00:05:04>
The lane was bordered on the left by wild, low-growing brambles,
on the right by a high, neatly manicured hedge.
<00:06:38>
The men's long cloaks flapped around their ankles as they marched.
<00:09:00>
"Thought I might be late," said Yaxley, his blunt features sliding in and
out of sight as the branches of overhanging trees broke the moonlight.
<00:10:50>
"It was a little trickier than I expected. But I hope he will be satisfied.
<00:11:06>
You sound confident that your reception will be good?" Snape nodded, but did not elaborate.
<00:12:15>
They turned right, into a wide driveway that led off the lane.
<00:12:31>
The high hedge curved into them, running off into the distance beyond the pair of
imposing wrought-iron gates barring the men's way.

DISPLAY UP TO THIS PART ⬇

<00:12:50>
Neither of them broke step: In silence both raised their left arms in a kind of salute and
passed straight through, as though the dark metal was smoke.
<00:12:58>
The yew hedges muffled the sound of the men's footsteps.
<00:13:12>
There was a rustle somewhere to their right.
<00:15:26>
Yaxley drew his wand again pointing it over his companion's head, but the source of the noise proved
to be nothing more than a pure-white peacock, strutting majestically along the top of the hedge.
<00:17:15>
He always did himself well, Lucius. Peacocks ···" Yaxley thrust his wand back under his cloak with a snort.
<00:18:13>
A handsome manor house grew out of the darkness at the end of the straight drive,
lights glinting in the diamond paned downstairs windows.
<00:20:21>
Somewhere in the dark garden beyond the hedge a fountain was playing.
<00:20:51>
Gravel crackled beneath their feet as Snape and Yaxley sped toward the front door,
which swung inward at their approach, though nobody had visibly opened it.
<00:23:17>
The hallway was large, dimly lit, and sumptuously decorated,
with a magnificent carpet covering most of the stone floor.
<00:23:40>
The eyes of the pale-faced portraits on the wall followed Snape and Yaxley as they strode past.

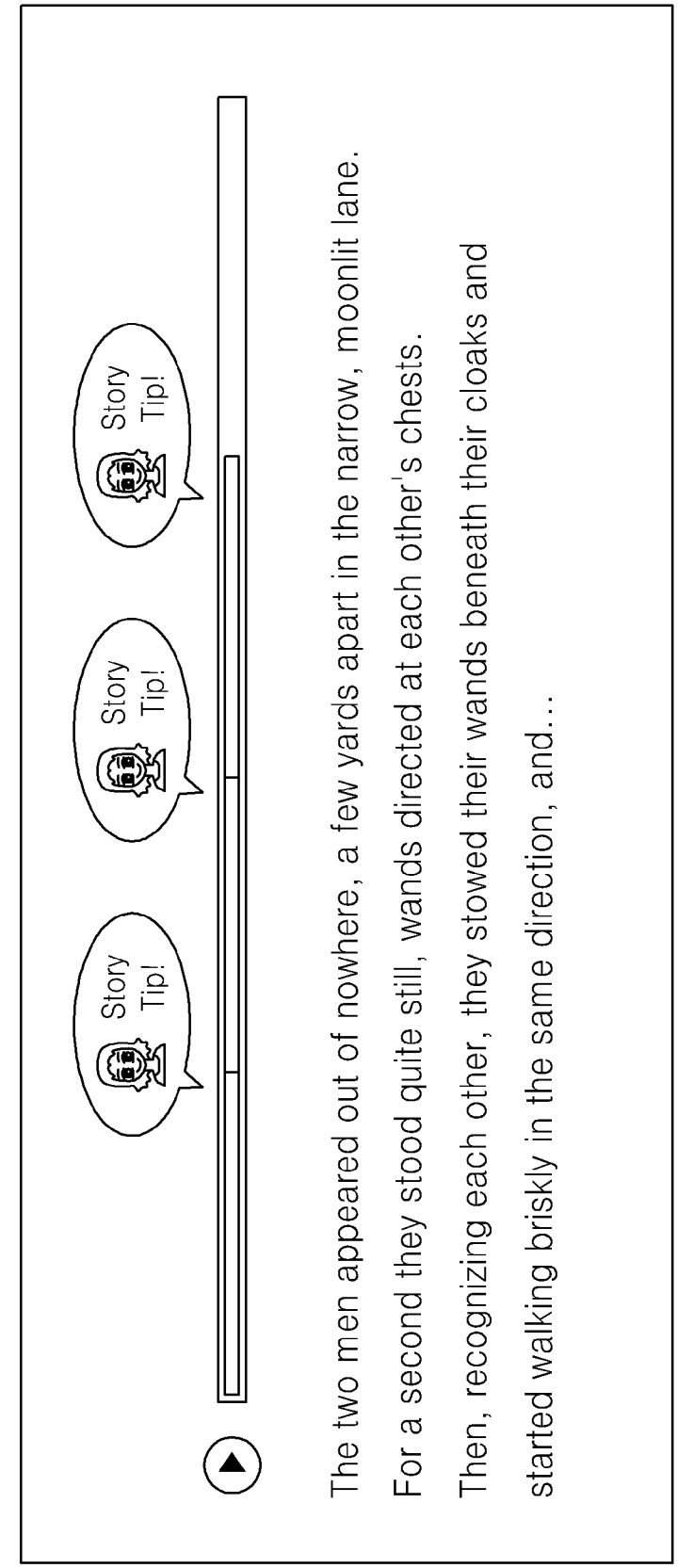

METHOD AND APPARATUS TO PROVIDE PLOT DATA OF CONTENTS

CROSS-REFERENCE TO RELATED APPLICATIONS

This application claims the benefit of Korean Patent Application No. 10-2007-0105036, filed on Oct. 18, 2007, in the Korean Intellectual Property Office, the disclosure of which is incorporated herein in its entirety by reference.

BACKGROUND OF THE INVENTION

1. Field of the Invention

The present general inventive concept relates to a method and apparatus for providing plot data of contents, which can provide time-based plot data.

2. Description of the Related Art

Generally, an apparatus which is for providing contents data, displays contents, which are stored on a disc, or flash memory, on a display apparatus such as a liquid crystal display (LCD) apparatus. When a user views a movie, sometimes this user may have difficulty in understanding the contents of the movie.

Accordingly, when a user views a movie, the user may want information regarding a plot of the movie, a scene description, or the like. Information regarding the plot or scene description may be in the form of metadata or text data.

At this time, when a user requests plot data or scene description data while watching image contents, an apparatus for providing contents data may provide information regarding a part of the image contents which a user has not yet watched, as well as providing necessary information.

However, when an apparatus for providing contents data provides a user with a story regarding the entire contents, the user may lose interest in a part of contents which the user has not yet watched.

SUMMARY OF THE INVENTION

The present general inventive concept provides a method and apparatus to provide plot data of contents, by which a summarized plot can be controlled to be provided up to a present time, instead of providing an entire plot, by using time information based on a request for plot data.

The present general inventive concept also provides an image display apparatus that can provide plot data of contents.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a method of providing plot data of contents, the method including: extracting a time of requesting plot data, based on time information that is recorded on a predetermined unit-by-unit basis, when a signal to request plot data is received while contents are being reproduced; checking whether there is time based plot metadata corresponding to the requested plot data; and extracting plot data corresponding to a period from a start time of contents to the time of requesting the plot data and displaying the plot data if the time based plot metadata exists.

The foregoing and/or other aspects and utilities of the present general inventive concept may also be achieved by providing an apparatus to provide plot data of contents, the apparatus including: a key input unit to input a request for plot data; a memory unit to store contents data and time based plot metadata; and a control unit to extract a time of requesting the plot data, based on time information recorded on a predetermined unit-by-unit basis of contents when a request for plot data is received through the key input unit while contents are being reproduced, and extracting plot data for a time previous to the time of requesting the plot data so as to display the extracted plot data if time based plot metadata exists in the memory unit.

The foregoing and/or other aspects and utilities of the present general inventive concept may also be achieved by providing an image display apparatus including: a key input unit to input a request for plot data; a memory unit to store contents data and time based plot metadata; a display unit to display the plot data requested by a user; a control unit to extract plot data corresponding to a period from a start time of reproducing to a time of requesting the plot data, which is stored in the memory unit, and to display the extracted plot data on the display unit; and an image processing unit to convert the plot data extracted by the control unit into an image signal.

The foregoing and/or other aspects and utilities of the present general inventive concept may also be achieved by providing an apparatus to provide plot data of contents of a movie, the apparatus including: a memory unit to store contents data and time based plot metadata; and a control unit to extract a time in which plot data is desired, based on time information recorded on a predetermined unit-by-unit basis of the contents when the plot data is desired while the contents are being reproduced, and to extract plot data for a time previous to the desired time of the plot data so as to display the extracted plot data if time based plot metadata exists in the memory unit.

The apparatus may further include a communication unit to receive time based plot metadata from a web server via a network in a wired/wireless manner when the plot metadata is not stored in the memory unit.

BRIEF DESCRIPTION OF THE DRAWINGS

The above and other features and advantages of the present general inventive concept will become more apparent by describing in detail exemplary embodiments thereof with reference to the attached drawings in which:

FIG. 2 is a flow chart of a method of providing plot data of contents, according to an embodiment of the present general inventive concept;

FIG. 3 is a view of a time-based plot file format, which is downloaded from a web server, according to an embodiment of the present general inventive concept;

FIG. 6 illustrates plot data displayed on a screen when a signal to request plot data is input by a user, according to an embodiment of the present general inventive concept.

DETAILED DESCRIPTION OF THE PREFERRED EMBODIMENTS

Figure 1:
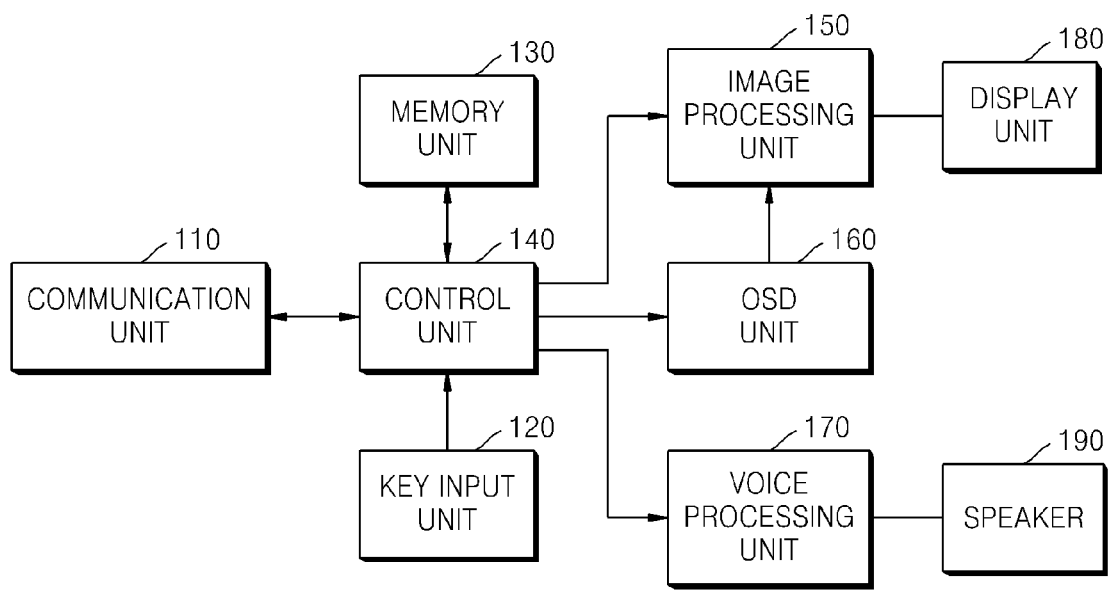
FIG. 1 is a block diagram of an image display apparatus to provide plot data of contents, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an image display apparatus to provide plot data of contents, according to an embodiment of the present general inventive concept.

Referring to FIG. 1, the image display apparatus according to the current embodiment includes a communication unit 110, a key input unit 120, a memory unit 130, a control unit 140, an image processing unit 150, an on screen display (OSD) unit 160, a voice processing unit 170, a display unit 180, and a speaker 190.

The communication unit 110 includes a wired/wireless communication interface, and performs interactive communication with a web server (not illustrated) via a network in a wired/wireless manner. The communication unit 110 receives time based plot metadata from the web server via a network in a wired/wireless manner, according to a signal to request plot data from the control unit 140.

At this time, according to a request for the plot data of the image display apparatus from the control unit 140, the web server provides the time based plot metadata of the corresponding plot data.

The key input unit 120 is used to input a user's request through a plurality of key modules or a touch screen. For example, the key input unit 120 is used to input the request for the plot data into the control unit 140 by using a predetermined key that is previously set.

The memory unit 130 can include a flash memory or a hard disk drive (HDD). The memory unit 130 stores a control program to control the control unit 140, and stores audio/visual (A/V) contents data and plot metadata as respective file formats that are previously set.

The OSD unit 160 generates an OSD signal, according to control of the control unit 140.

When the control unit 140 receives the signal to request the plot data through the key input unit 120 while contents (i.e., a movie) are being reproduced, the control unit 140 extracts a time of requesting the plot data, based on time information that is recorded on a predetermined unit-by-unit basis, and checks whether the time based plot metadata of the corresponding plot data is in the memory unit 130. Then, if the time based plot metadata is in the memory unit 130, the control unit 140 extracts plot data corresponding to a period from a start time to the request time and outputs the plot data to the image processing unit 150. In addition, the control unit 140 decodes compressed image data or voice data.

If the time based plot metadata is not in the memory unit 130, the control unit 140 downloads the time based plot metadata of the corresponding plot data through the communication unit 110 from the web server. Then, the control unit 140 extracts plot metadata for a period up to the request time, and outputs the plot metadata to the image processing unit 150.

The image processing unit 150 converts the compressed image data, which is decoded by the control unit 140, or the plot data into R, G and B signals, and combines the OSD signal generated by the OSD unit 160 with the R, G and B signals.

The voice processing unit 170 converts the voice data decoded by the control unit 140 into an analog audio signal.

The display unit 180 displays various pieces of information, which are output by the image processing unit 150, in the form of a pop-up screen or graphics, and displays the plot data requested by a user.

The speaker 190 reproduces an audio signal, which is output by the memory unit 130 or the control unit 140, as sound.

FIG. 2 is a flow chart of a method of providing plot data of contents, according to an embodiment of the present general inventive concept.

First, contents selected by a key input are reproduced (operation 210). At this time, an image display apparatus reproduces a broadcasting stream received from a broadcasting station, or reproduces a title stored in CD/DVD or A/V contents stored in a memory.

It is checked whether a request for plot metadata is input by a user through a predetermined key (operation 220).

If the request for the plot metadata is received, the time of requesting the plot metadata is extracted by using time information such as a time stamp that is recorded in an A/V stream on a predetermined unit-by-unit basis (operation 230).

Next, it is checked whether plot metadata of corresponding contents is recorded in the memory by using track information, additional information, or the like, which is stored in the memory (operation 240).

At this time, the plot metadata is either recorded in a contents file or a broadcasting stream, or is downloaded through a web server.

For example, the plot metadata stored in the contents file is linked to information regarding the time of reproducing contents, which is recorded in a predetermined track.

If the plot metadata is recorded in a broadcasting stream, text information regarding plot data recorded on a predetermined unit-by-unit basis is extracted from the broadcasting stream. Then, the text information regarding the plot data is synchronized with scene description metadata, and the synchronized scene description metadata and text information regarding plot data constitute a story table.

At this time, if the plot metadata of the corresponding contents is recorded in the memory, the plot metadata is extracted corresponding to the period from the time of starting contents data to the time of requesting the plot data, based on the time of requesting the plot data (operation 260). For example, if the time of requesting the plot data is compared with time information that is recorded on a predetermined unit-by-unit basis, it is determined that the plot data corresponding to the time information is the plot data corresponding to the time of requesting the plot data. In addition, the plot metadata of the corresponding contents is extracted from the memory.

However, if the plot metadata of corresponding contents is not recorded in the memory, the memory is requested to download the time based plot metadata from a web server. Then, the plot metadata is extracted from the plot data of corresponding contents which are downloaded to the memory, corresponding to a period from a start time to the time of requesting the plot data, based on the time of requesting the plot data (operation 260).

Next, the extracted plot metadata is displayed corresponding to a period from the start time to the time of requesting the plot data on a screen (operation 270).

FIG. 3 is a view of a time-based plot file format, which is downloaded from a web server, according to an embodiment of the present general inventive concept.

Referring to FIG. 3, when a user views movie contents, if the user wants plot data corresponding to the move contents, an image display apparatus can download a time based text from the web server.

At this time, the image display apparatus displays only plot data for a time previous to the set time, according to time information. For example, when the time of requesting plot data is "00:12:15", only plot data from "00:00:00" is displayed on a screen, which corresponds to a start time of reproducing an image to "00:12:15", which corresponds to a request time of requesting the plot data.

Figure 4:
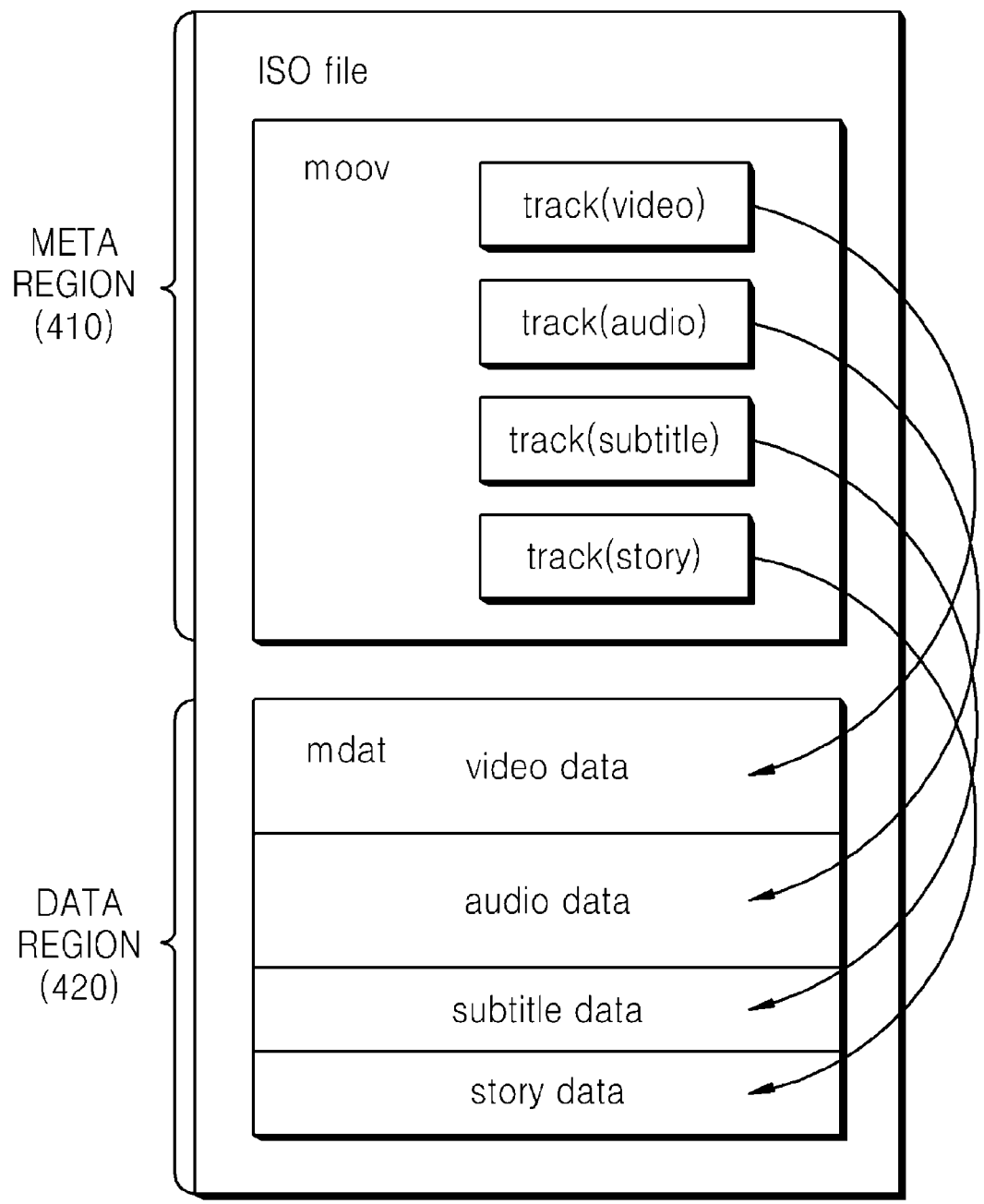
FIG. 4 is a view of a file format in which plot data is stored, according to an embodiment of the present general inventive concept.

FIG. 4 is a view of a file format in which plot data is stored, according to an embodiment of the present general inventive concept.

Referring to FIG. 4, the plot data is stored as an international standardization organization (ISO) based media file format.

The ISO based media file format includes a meta region 410 and a data region 420.

The meta region 410 records index information regarding respective video, audio, sub-titles and plot data on a track-by-track basis. The index information includes a reproducing time and position information.

The data region 420 records data corresponding to the respective video, audio, sub-title and plot (story) data, which respectively correspond to the position information recorded in the meta region 410. Respective tracks of the meta region 410 are linked to plot metadata of the data region 420.

Accordingly, time based plot metadata is divided so as to be stored in the meta region 410 in which the reproducing time and the position information are recorded, and in the data region 420 in which plot data is recorded.

Figure 5:
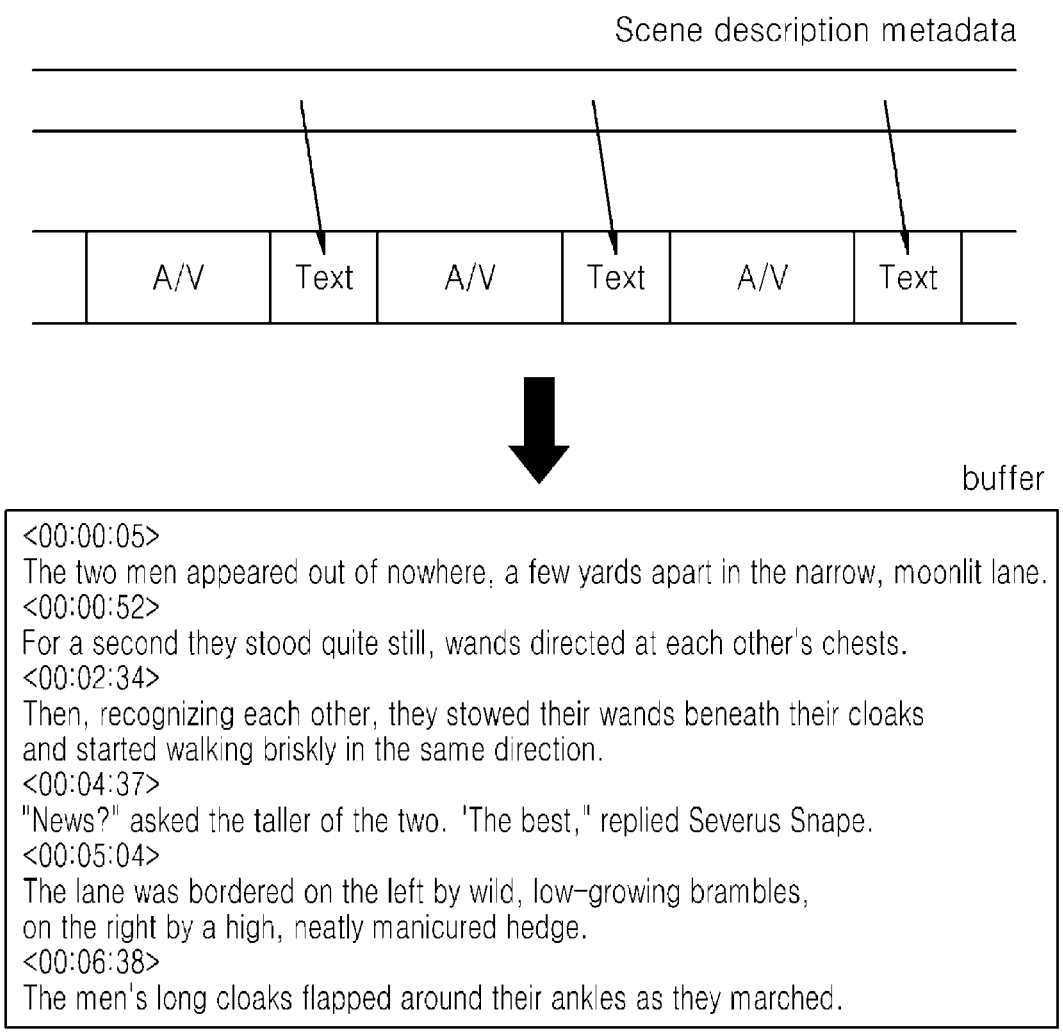
FIG. 5 illustrates construction of plot data of a broadcasting stream, according to an embodiment of the present general inventive concept.

FIG. 5 illustrates construction of plot data of a broadcasting stream, according to an embodiment of the present general inventive concept.

Referring to FIG. 5, the broadcasting stream includes scene description metadata together with A/V data and text.

At this time, text regarding the plot data recorded on a predetermined unit-by-unit basis is extracted from the broadcasting stream. The scene description metadata is synchronized with the text regarding the plot data to constitute a story table in a buffer.

FIG. 6 illustrates plot data displayed on a screen when a signal to request plot data is input by a user, according to an embodiment of the present general inventive concept.

Referring to FIG. 6, whenever a user selects a story tip that is already set, the plot data is displayed on the screen, corresponding to a period from a start time of contents to a time corresponding to the selected story tip.

The general inventive concept can also be embodied as computer readable codes on a computer readable recording medium. The computer readable recording medium can be any data storage device that can store data which can be thereafter read by a computer system. Examples of the computer readable recording medium may include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present general inventive concept, an image display apparatus can accurately extract plot data up to a present time in entire plot data by using time information according to a request for the plot data. Accordingly, when the image display apparatus receives the request for the plot data, the image display apparatus can accurately provide a summarized story to a user based on a desired time period.

While the present general inventive concept has been particularly illustrated and described with reference to exemplary embodiments thereof, it will be understood by one of ordinary skill in the art that various changes in form and details may be made therein without departing from the spirit and scope of the present general inventive concept as defined by the following claims.

What is claimed is:

1. A method of providing plot data of contents, the method comprising:
   extracting a time of requesting plot data corresponding to a period from a time of starting contents to the time of requesting the plot data, based on time information that is recorded on a predetermined unit-by-unit basis, when a signal to request plot data is received while contents are being reproduced;
   checking whether there is recorded time based plot metadata corresponding to the requested plot data; and
   extracting plot data corresponding to the period of extracted time and displaying the plot data if the time based plot metadata exists.

2. The method of claim 1, further comprising:
   downloading time based plot metadata corresponding to the plot data from a web server when there is no plot metadata recorded.

3. The method of claim 1, wherein the extracting of the time of requesting the plot data comprises:
   extracting a time of requesting plot metadata by using a time stamp recorded in the contents on a predetermined unit-by-unit basis.

4. The method of claim 1, wherein the time based plot metadata is divided so as to be stored in a meta region in which a reproducing time and position information is recorded, and in a data region in which plot data is recorded.

5. The method of claim 1, wherein when the contents are broadcasting streams, the plot data is configured by a method comprising:
   extracting text information regarding plot data recorded in a broadcasting stream on a predetermined unit-by-unit basis; and
   synchronizing scene description metadata with the text information regarding the plot data.

6. The method of claim 1, wherein the extracting of the plot data comprises:
   comparing the time of requesting the plot data with time information that is recorded on a predetermined unit-by-unit basis and checking whether the plot data corresponding to the time information is the plot data corresponding to the time of requesting the plot data; and
   extracting the checked plot data.

7. An apparatus to provide plot data of contents, the apparatus comprising:
   a key input unit to input a request for plot data;
   a memory unit to store contents data and time based plot metadata; and
   a control unit to extract a time of requesting the plot data corresponding to a period from a time of starting the contents to the time of requesting the plot data, based on time information recorded on a predetermined unit-by-unit basis of contents when a request for plot data is received through the key input unit while contents are being reproduced, and to extract plot data corresponding to the period of extracted time so as to display the extracted plot data if time based plot metadata exists in the memory unit.

8. The apparatus of claim 7, further comprising:
   a communication unit to receive time based plot metadata from a web server via a network in a wired/wireless manner.

9. An image display apparatus comprising:
- a key input unit to input a request for plot data corresponding to a period from a time of starting contents data to a time of requesting the plot data;
- a memory unit to store contents data and time based plot metadata;
- a display unit to display the plot data requested by a user;
- a control unit to extract plot data corresponding to the period of requested data, which is stored in the memory unit, and to display the extracted plot data on the display unit; and
- an image processing unit to convert the plot data extracted by the control unit into an image signal.

10. A non-transitory computer-readable recording medium having recorded thereon a program to implement a method of providing plot data of contents, the method comprising:
- extracting a time of requesting plot data corresponding to a period from a time of starting the contents to a time of requesting the plot data, based on time information that is recorded on a predetermined unit-by-unit basis, when a signal to request plot data is received while contents are being reproduced;
- checking whether there is time based plot metadata corresponding to the requested plot data; and
- extracting plot data corresponding to the period from of the time of starting the contents to the time of requesting the plot data and displaying the plot data if the time based plot metadata exists.

11. An apparatus to provide plot data of contents of a movie, the apparatus comprising:
- a memory unit to store contents data and time based plot metadata; and
- a control unit to extract a time in which plot data is desired, the time corresponding to a period from a time of starting the contents to a time of requesting the plot data, based on time information recorded on a predetermined unit-by-unit basis of the contents when the plot data is desired while the contents are being reproduced, and to extract plot data corresponding to the period of requested data of a time of starting the contents to a time of requesting the plot data so as to display the extracted plot data if time based plot metadata exists in the memory unit.

12. The apparatus of claim 11, further comprising:
- a communication unit to receive time based plot metadata from a web server via a network in a wired/wireless manner when the plot metadata is not stored.

* * * * *